US012021305B1

(12) United States Patent
Salem et al.

(10) Patent No.: US 12,021,305 B1
(45) Date of Patent: Jun. 25, 2024

(54) CONFORMAL ANTENNA SYSTEM

(71) Applicant: Ball Aerospace & Technologies Corp., Boulder, CO (US)

(72) Inventors: Matthew G. Salem, Westminster, CO (US); Clifford E. Kintner, Thornton, CO (US); Louis A. DelVecchio, Lakewood, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 2 days.

(21) Appl. No.: 17/848,168

(22) Filed: Jun. 23, 2022

Related U.S. Application Data

(60) Provisional application No. 63/214,026, filed on Jun. 23, 2021.

(51) Int. Cl.

| | |
|---|---|
| ***H01Q 21/00*** | (2006.01) |
| ***H01Q 1/42*** | (2006.01) |
| ***H01Q 21/06*** | (2006.01) |
| ***H01Q 21/20*** | (2006.01) |

(52) U.S. Cl.
CPC ........... *H01Q 21/0006* (2013.01); *H01Q 1/42* (2013.01); *H01Q 21/065* (2013.01); *H01Q 21/20* (2013.01)

(58) Field of Classification Search
CPC .. H01Q 21/0006; H01Q 21/065; H01Q 21/20; H01Q 1/42
See application file for complete search history.

(56) References Cited

U.S. PATENT DOCUMENTS

| | | | | |
|---|---|---|---|---|
| 8,334,809 | B2 * | 12/2012 | Nichols ................ | H01Q 1/3275 343/700 MS |
| 8,447,385 | B2 | 5/2013 | Sterzer et al. | |
| 9,001,879 | B2 | 4/2015 | Maltsev et al. | |
| 9,001,917 | B2 | 4/2015 | Tzanidis et al. | |

(Continued)

FOREIGN PATENT DOCUMENTS

| | | |
|---|---|---|
| EP | 2178119 | 4/2010 |
| WO | WO 2017/078851 | 5/2017 |
| WO | WO 2017/086855 | 5/2017 |

OTHER PUBLICATIONS

Ershadi et al. "Wideband Subarray Design for 5G Antenna Arrays," IEEE, 2016 URSI Asia-Pacific Radio Science Conference, Aug. 21-25, 2016, Seoul, Korea, pp. 185-187.

(Continued)

*Primary Examiner* — Jason M Crawford
(74) *Attorney, Agent, or Firm* — Sheridan Ross P.C.

(57) ABSTRACT

Systems and methods for providing a high gain antenna are disclosed. The antenna can include an array of active antenna elements disposed on a first side of a first circuit board. The active antenna elements are grouped into a number of super elements. Each super element occupies at least a portion of an outside edge of an area containing the active antenna elements. Passive antenna elements can be disposed so as to surround the area containing the active antenna elements. Passive circuit components can be disposed on a second side or on an intermediate layer of the first circuit board. Active circuit components can be disposed on a second circuit board. The active components can be supplied with power and control signals. The first and second circuit boards can be held together by a housing. The antenna can be configured as conformal array antennas.

13 Claims, 13 Drawing Sheets

(56) References Cited

U.S. PATENT DOCUMENTS

| | | | | |
|---|---|---|---|---|
| 9,343,817 | B2 | 5/2016 | Pan | |
| 9,531,450 | B2 | 12/2016 | Maltsev et al. | |
| 9,584,231 | B2 | 2/2017 | Xu et al. | |
| 9,660,345 | B1 | 5/2017 | Gu et al. | |
| 10,714,829 | B2 | 7/2020 | Raney et al. | |
| 2008/0122071 | A1 | 5/2008 | Tseng et al. | |
| 2011/0308781 | A1 | 12/2011 | O'Riordan et al. | |
| 2014/0071018 | A1 | 3/2014 | Pan | |
| 2014/0072078 | A1 | 3/2014 | Sergeyev et al. | |
| 2014/0145879 | A1 | 5/2014 | Pan | |
| 2014/0240186 | A1 | 8/2014 | Zhou et al. | |
| 2014/0266897 | A1 | 9/2014 | Jakoby et al. | |
| 2015/0035714 | A1 | 2/2015 | Zhou | |
| 2015/0200452 | A1 | 7/2015 | Oh et al. | |
| 2015/0222333 | A1 | 8/2015 | Maltsev et al. | |
| 2015/0303587 | A1 | 10/2015 | Pan | |
| 2016/0049723 | A1 | 2/2016 | Baks et al. | |
| 2016/0127003 | A1 | 5/2016 | Xu et al. | |
| 2016/0149315 | A1 | 5/2016 | Elsherbini et al. | |
| 2016/0204507 | A1 | 7/2016 | Karjalainen | |
| 2016/0218429 | A1 | 7/2016 | Klemes | |
| 2016/0241348 | A1 | 8/2016 | Zirwas et al. | |
| 2016/0330643 | A1 | 11/2016 | Sahin et al. | |
| 2016/0365900 | A1 | 12/2016 | Kim et al. | |
| 2017/0033462 | A1 | 2/2017 | Clemente et al. | |
| 2017/0085006 | A1 | 3/2017 | Corman et al. | |
| 2017/0126304 | A1 | 5/2017 | Black et al. | |
| 2017/0127295 | A1 | 5/2017 | Black et al. | |
| 2017/0141465 | A1 | 5/2017 | Sharawi | |
| 2017/0149143 | A1 | 5/2017 | Zirwas et al. | |
| 2018/0109005 | A1* | 4/2018 | Milano | H01Q 21/0075 |
| 2018/0166781 | A1* | 6/2018 | Snyder | H01Q 21/08 |
| 2018/0351250 | A1* | 12/2018 | Achour | H01Q 21/064 |
| 2019/0326684 | A1* | 10/2019 | Achour | H01Q 3/34 |
| 2019/0356060 | A1* | 11/2019 | Daniel | H01Q 3/44 |

OTHER PUBLICATIONS

Ojaroudiparchin et al. "Multi-Layer 5G Mobile Phone Antenna for Multi-User MIMO Communications," IEEE, 23rd Telecommunications forum Telfor 2015, Serbia, Belgrade, Nov. 24-26, 2015, pp. 559-562.

Ojaroudiparchin et al. "A 28 GHz FR-4 Compatible Phased Array Antenna for 5G Mobile Phone Applications," IEEE, 2015 International Symposium on Antennas and Propagation (ISAP), 2015, 4 pages.

Rebeiz et al. "Millimeter-Wave Large-Scale Phased-Arrays for 5G Systems," 2015 IEEE MTT-S International Microwave Symposium, May 2015, 3 pages.

International Search Report and Written Opinion for International (PCT) Patent Application No. PCT/US2018/31872, dated Aug. 1, 2018 9 pages.

International Preliminary Report on Patentability for International (PCT) Patent Application No. PCT/US2018/31872, dated Nov. 21, 2019, 8 pages.

Official Action for U.S. Appl. No. 15/975,331, dated Aug. 7, 2019, 14 pages.

Official Action for U.S. Appl. No. 15/975,331, dated Nov. 12, 2019, 14 pages.

Notice of Allowance for U.S. Appl. No. 15/975,331, dated Mar. 11, 2020, 8 pages.

Corrected Notice of Allowance for U.S. Appl. No. 15/975,331, dated Jun. 11, 2020, 3 pages.

* cited by examiner

CONFORMAL ANTENNA SYSTEM

CROSS-REFERENCE TO RELATED APPLICATION

This application claims the benefit of U.S. Provisional Patent Application Ser. No. 63/214,026, filed Jun. 23, 2021, the entire disclosure of which is hereby incorporated herein by reference.

FIELD

The present disclosure is generally related to antennas and more particularly to antenna systems having a low profile and that are capable of supporting high data rates and of being produced at relatively low cost.

BACKGROUND

Future datalinks require high data rates over long ranges compared to currently fielded systems. Long range datalinks typically operate in the very high frequency (VHF) and ultra high frequency (UHF) radio frequency (RF) bands. At these frequencies, the usable RF bandwidth is limited to a few megahertz. In order to increase the data rate, new communication systems require the RF system to operate at much higher frequencies (ex. X and Ku bands). At these higher frequencies the RF bandwidth can be increased to hundreds of MHz; however, the RF path loss between two communication nodes is significantly higher at higher frequencies. For example, the loss over 100 feet of free space is 20 dB higher at X band than at VHF. In order to compensate for this higher path loss, higher gain antennas are required. This can be a problem on small platforms that require conformal antennas, such as missiles and unmanned aerial vehicles (UAVs).

Typical long range datalinks operating in or above the X band use dish antennas or large phased arrays. These antennas have the antenna gain, transmit power, and receive sensitivity necessary to send and receive signals over very long ranges. This includes but is not limited to satellite communications. These antennas are always large, can be non-conformal (such as a dish antenna), and can be very expensive (such as large phased arrays). Small, conformal, low-cost fixed-beam and switched-beam antenna arrays have also been used for short range line of sight datalinks, however they do not meet the desired link budget and field of view for next generation platforms.

SUMMARY

Embodiments of the present disclosure provide low-cost high-gain datalink antenna systems that provide the gain, transmit power, and receiver sensitivity necessary to meet the desired link budget over a ±60° field of view. The antenna is extremely small, lightweight and inexpensive making it suitable for missile and UAV platforms.

In accordance with embodiments of the present disclosure, an antenna system is provided that combines a number of antenna elements into super elements. The super elements are arranged so that each super element includes elements located along a periphery of the active array. Passive support electronics, such as combiners and signal conditioning elements, are located with the antenna array on a first or upper circuit board. As these elements are entirely passive, no power or digital control signals need to be provided to the elements included in the first circuit board. Therefore, the first circuit board is simple to fabricate and test. Radio frequency (RF) beam steering circuitry, power conditioning elements, digital control circuitry, an N:1 RF combiner, and other elements can be included in a second or lower circuit board. In accordance with at least some embodiments of the present disclosure, the first and second circuit boards can be integrated using a number of push-on RF connectors. In addition, the first and second circuit boards can be placed within a housing that ensures that the two circuit boards remain mated to one another. The housing can additionally act as a thermal heat sink.

The housing, boards, and other components of the antenna system can be provided as a low profile package that can be easily integrated into a vehicle or platform electronic system and structure. In accordance with at least some embodiments of the present disclosure, the antenna system can be deployed as a conformal system carried by or integrated with a platform or vehicle. Moreover, the system can be used to enable both X band and Ku band long range datalinks.

Additional features and advantages of embodiments of the disclosed antenna array systems and methods will become more readily apparent from the following description, particularly when considered together with the accompanying drawings.

DETAILED DESCRIPTION

Figure 1:
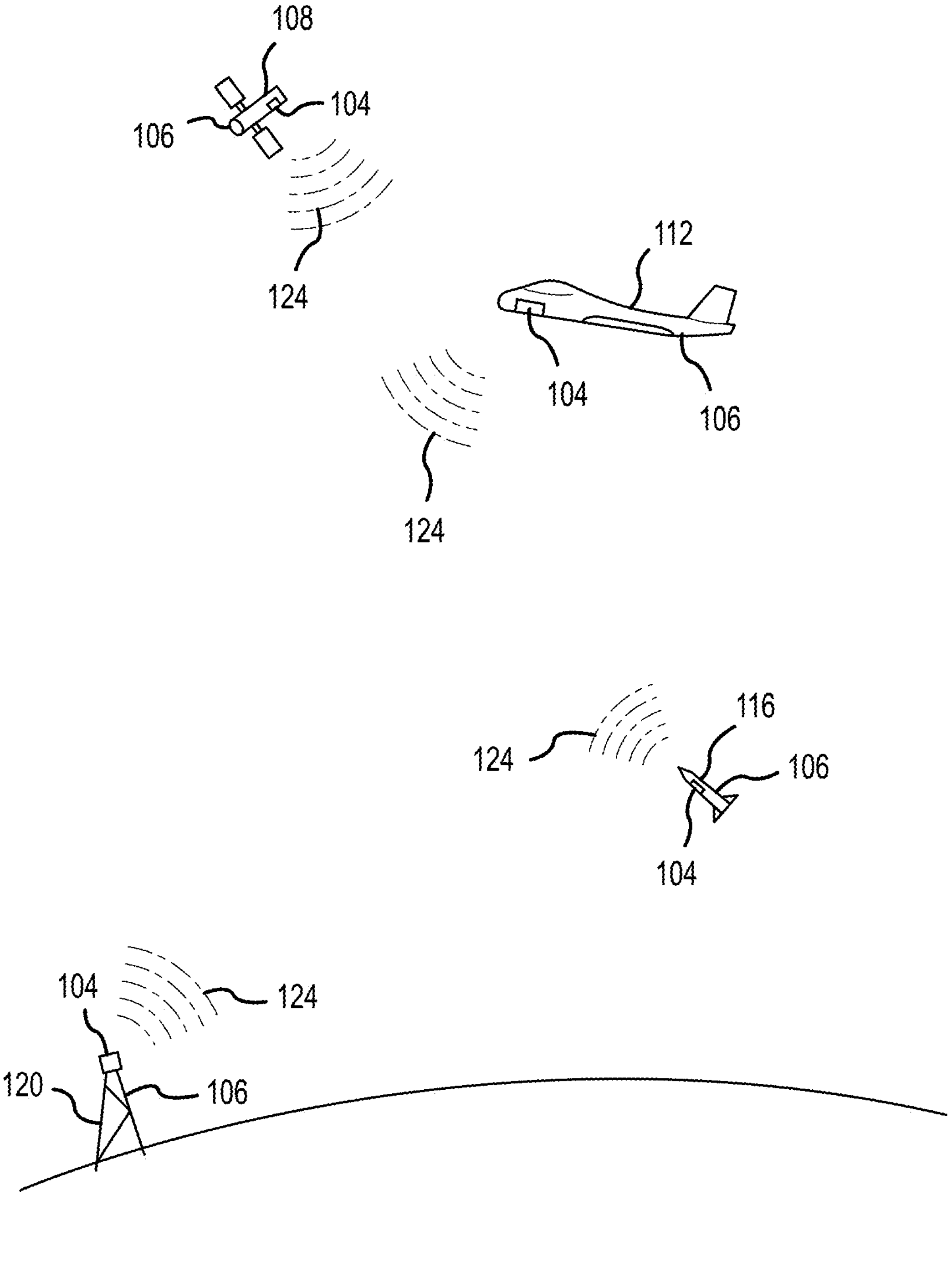
FIG. 1 depicts an antenna system including an antenna with an array of antenna elements in accordance with embodiments of the present disclosure in a variety of example operational scenarios.

FIG. 1 depicts instances of an antenna system 104 in accordance with embodiments of the present disclosure, in a number of example operational scenarios. As shown, an antenna system 104 as disclosed herein can be carried by or mounted to different platforms 106, including mobile platforms, such as a satellite 108, an aircraft 112, a missile 116, or a drone; or stationary platforms, such as a tower 120 or a building. Moreover, in accordance with at least some embodiments of the present disclosure, an antenna system 104 can be configured to conform or partially conform to an exterior surface of an associated platform 106. An antenna system 104 can be operated to pass radio frequency (RF) signals 124 between another antenna system 104 in accordance with embodiments of the present disclosure, or with antenna systems of other types. An antenna system 104 as disclosed herein can be configured to transmit RF signals 124, receive RF signals 124, or transmit and receive RF signals 124. Moreover, it should be appreciated that the RF signals 124 can be transmitted for any purpose, including but not limited to general communications, telemetry, guidance, object detection, signal detection, or other information types.

Figure 2A:
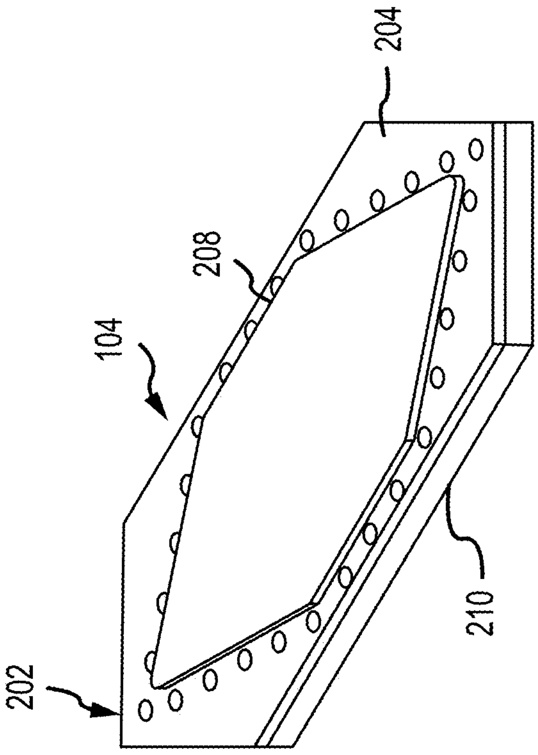
FIG. 2A depicts an antenna system in accordance with embodiments of the present disclosure in a top perspective view.
Figure 2D:
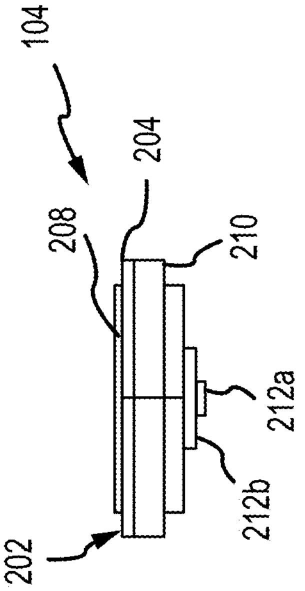
FIG. 2D depicts an antenna system in accordance with embodiments of the present disclosure in an end elevation view.
Figure 2B:
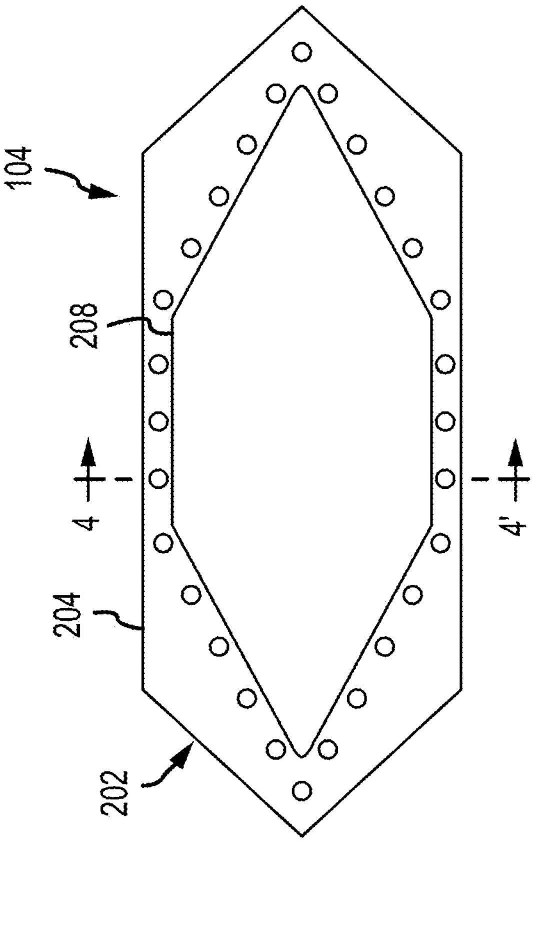
FIG. 2B depicts an antenna system in accordance with embodiments of the present disclosure in a top plan view.
Figure 2C:
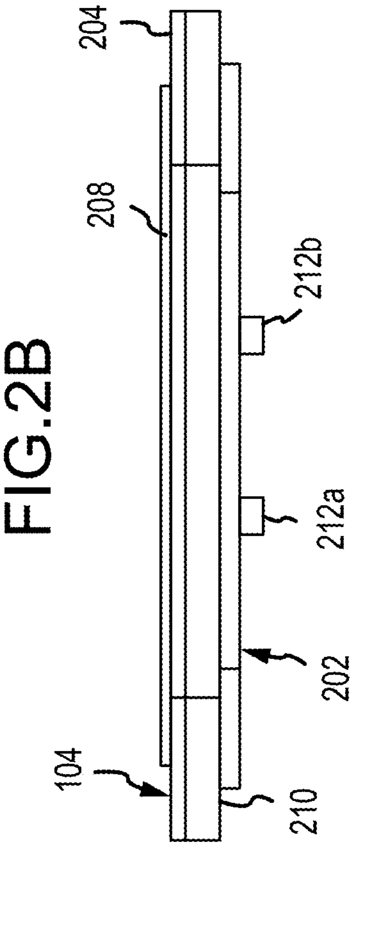
FIG. 2C depicts an antenna system in accordance with embodiments of the present disclosure in a side elevation view.

FIGS. 2A-D are views of exterior or package components of an antenna system 104 in accordance with embodiments of the present disclosure. In particular, FIG. 2A shows an antenna system 104 in a top perspective view, FIG. 2B shows the antenna system 104 in a top plan view, FIG. 2C shows the antenna system 104 in a side elevation view, and FIG. 2D shows the antenna system 104 in an end elevation view. The antenna system 104 can be provided as a package or component 202 having a number of exterior housing or enclosure components, such as a top plate or cover 204, a radome 208, and a bottom plate or base 210. The antenna system 104 can also include various power and communication connectors 212. Provisions for mechanically fastening the antenna system 104 can also be included as part of the exterior components of the package 202. Accordingly, a package 202 incorporating an antenna system 104 in accordance with embodiments of the present disclosure can be easily attached to and integrated with a platform 106.

In accordance with embodiments of the present disclosure, at least a top surface of the cover 204 and the radome 208 can be shaped such that the antenna system 104 package 202 is conformal or substantially conformal to an exterior surface of an associated platform 106. For example, at least the top surface of the cover 204 and/or the radome 208 can be curved along one or more axes to conform or substantially conform to an exterior surface of surrounding portions of an exterior surface of an associated platform 106. Alternatively or in addition, at least the outer surface of the cover 204 and/or the radome 208 can be faceted to follow or approximately follow a contour of a surface of an associated platform 106. As yet another example, for example where at least the portion of a platform 106 to which the antenna system 104 package 202 is to be mounted is planar, the outer surface of the cover 204 and radome 208 can also be planar. In accordance with still other embodiments of the present disclosure, a surface of the base plate 210 can be configured to conform to a mounting surface of the associated platform 106. Moreover, the base plate 210 can include features or elements for mechanically joining the antenna system 104 package 202 to the platform 106.

Figure 3:
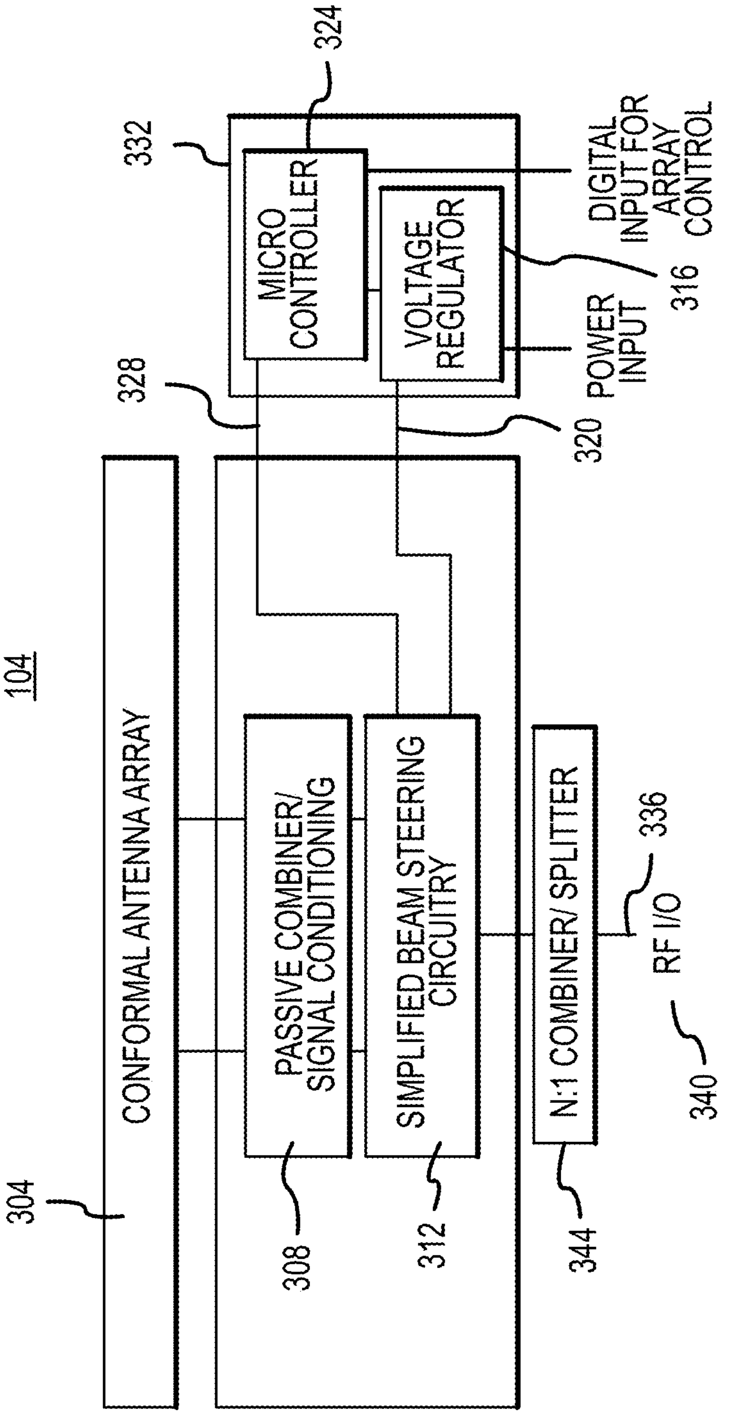
FIG. 3 is a functional block diagram depicting components of an antenna system in accordance with embodiments of the present disclosure.

FIG. 3 depicts functional components of an antenna system 104 in accordance with embodiments of the present disclosure in block diagram form. The components generally include a conformal antenna array 304. As discussed in greater detail elsewhere herein, the conformal antenna array 304 generally includes a number of passive and active antenna elements. The components of the antenna system 104 also include passive feed circuit components or elements 308, such as passive combiner and a signal conditioning components, and active feed circuit components or elements 312, such as beam steering components. In general, each active antenna element is connected to one or more passive feed circuit elements 308 and in turn to one or more active feed circuit elements 312. As used herein, a passive circuit element 308 is an element that does not require and that is not provided with any control signal or power supply. The passive feed circuit elements 308 can be provided as part of a first circuit board or other assembly that is entirely passive in that it is not supplied with power or control signals. The active feed circuit elements 312, can be provided separately from the passive feed circuit elements 308. Moreover, the active feed circuit elements 312 can be provided as part of a second circuit board or assembly. In addition, the active feed circuit elements 312 can include components that are connected to a voltage regulator or other power supply 316 via a power distribution circuit 320, and a microcontroller or other control system 324 via a control signal network or circuit 328. The power supply 316 and control system 324 components can be included as part of a support electronics package 332. RF input and/or output signals 336 can be passed between the antenna system 104 and radio transceiver components via an RF input/output (I/O) interface 340 and an N:1 combiner/splitter 344 provided between the RF input/output interface 340 and the feed circuit elements 312.

Figure 4:
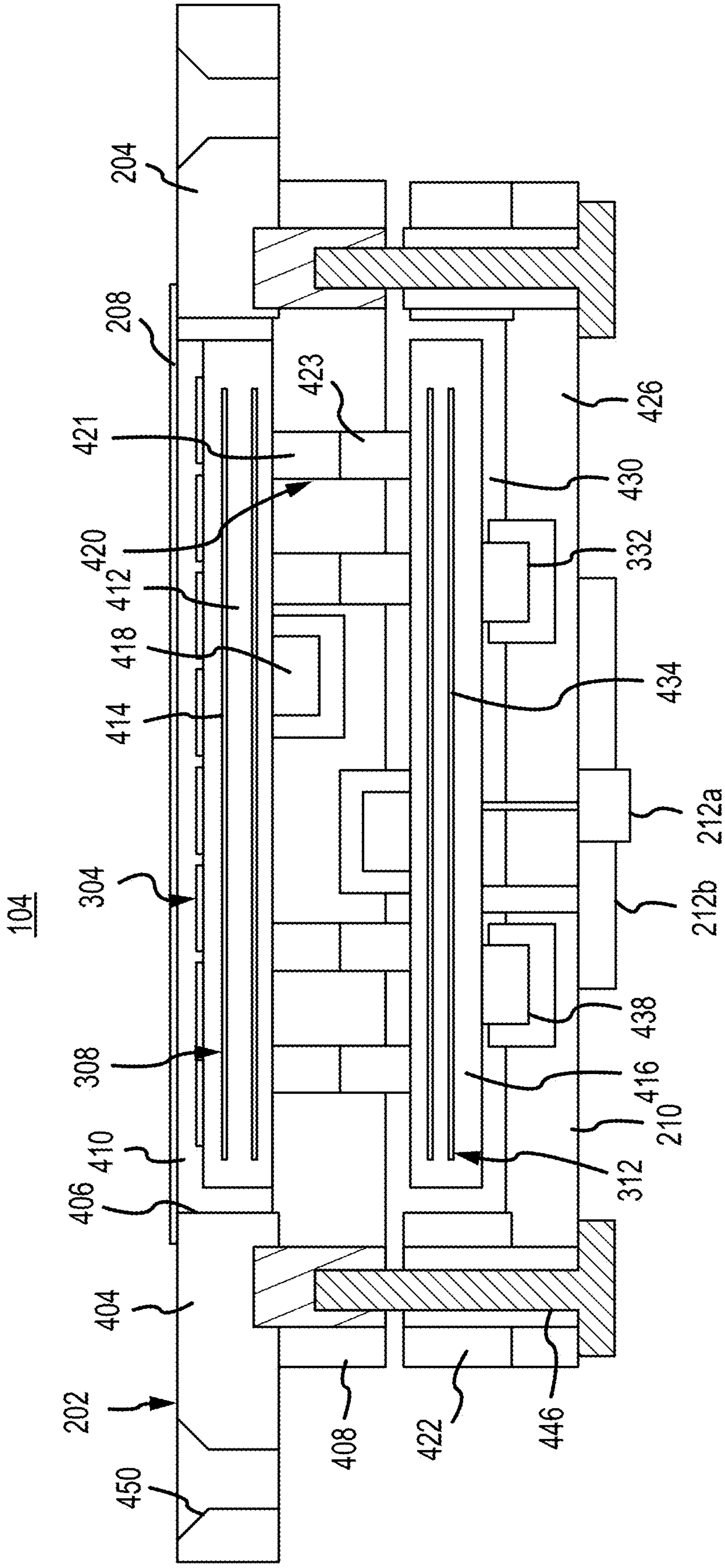
FIG. 4 depicts an antenna system in accordance with embodiments of the present disclosure in a cross section view taken along line 4-4' in FIG. 2B.

FIG. 4 depicts an arrangement of components of an antenna system 104 in accordance with embodiments of the present disclosure in a cross section view taken along section line 4-4' of FIG. 2B. As seen in this view, the package or housing 202 includes a top plate or cover 204 component and a bottom plate or base 210 component.

Some or all of the package 202 components can themselves be formed from a number of interconnected components. For instance, in the example antenna system 104 illustrated in FIG. 4, the top plate 204 includes a frame or peripheral portion 404 and a central or core portion 408. Whether formed from a number of component parts or as a unitary piece of material, the top plate 204 can be configured to provide a least a portion of an antenna element volume 410. For example, an antenna element volume 410 can be formed in which the antenna array 304 of the antenna system 104 is received. The antenna array 304 can be provided as part of or on a first circuit board 412 that is disposed within the antenna element volume 410 that is at least partially defined or provided by the top plate 204. This first circuit board 412 can include some or all of the passive feed circuit elements 308. Moreover, the passive feed circuit elements 308 can include signal paths, including signal paths connecting passive feed circuit elements 308 to active antenna elements, or other circuit components that are at least partially formed from wiring layers 414 that are integral to the first circuit board 412, surface mount components 418 that are mounted to the first circuit board 412, and/or connections to other circuit boards or components. In accordance with embodiments of the present disclosure, the radome 208 extends over the antenna element volume 410, thereby providing an exterior housing 202 surface that is conformal or substantially conformal to a surface of a platform 106 to which the antenna system 104 is mounted.

The base 210 in this example includes a peripheral or spacer portion 422 and a central or main section 426. Whether formed from a number of component parts or as a unitary piece of material, the base 210 can be configured to provide at least a portion of an active feed circuit element volume 430. More particularly, some or all of the active feed circuit elements 312 can be provided as part of or on a second circuit board 416 that is disposed within the active feed circuit element volume 430. The active feed circuit elements 312 can include signal paths or other circuit components that are at least partially formed from wiring layers 434 that are integral to the second circuit board 416, some or all of the components of the support electronics package 332, surface mount components 438 that are mounted to the second circuit board 416, and/or connections to other circuit boards or components. In addition to the active feed circuit elements 312, other components, such as but not limited to radio frequency signal connectors 212*a*, and power supply connectors 212*b*, can be provided as part of and/or can be joined to the second circuit board 416. As shown in the example illustration, the active feed circuit volume 430 can face the top plate 204. Moreover, the active feed circuit volume 430 can be a closed or substantially closed volume when the top plate 204 and the base 210 are connected to one another.

Accordingly, the top plate 204 provides a structure to which an integrated conformal antenna array 304 and passive feed circuit components 308 are mounted. The base 210 provides a structure for supporting or housing other components, such as but not limited to the active feed circuit elements 312, the support electronics package 332, radio frequency signal connectors 212*a*, and power supply connectors 212*b*. As depicted, the circuit boards 412 and 416 can be configured as planar elements with facing surfaces that are parallel to one another. In accordance with further embodiments of the present disclosure, the circuit boards 412 and 416 can be curved or faceted. In addition, the housing 202 can be configured to ensure that the first circuit board 412 remains operatively joined to the second circuit board 416 via a set of signal connectors 420. The signal connectors 420 generally include first portions 421 provided as part of or connected to the first circuit board 412, and second portions 423 provided as part of or connected to the second circuit board 416. Accordingly, passive feed circuit components 308 are operably connected to corresponding active feed circuit elements 312 by the signal connectors 420. As can be appreciated by one of skill in the art after consideration of the present disclosure, the security of the interconnections between the portions 421 and 423 of the signal connectors 420 can be insured by configuring the package 202 such that, by securing the top plate 204 and base 210 to one another, the cooperating first 421 and second 423 portions of the interconnects are also drawn together. As an example, but without limitation, the signal connectors 420 can include microwave Gilbert push-on interconnects (GPO), GPPO interconnects, or G3PO interconnects.

In accordance with embodiments of the present disclosure, the circuit boards 412 and 416 are double or multi layered circuit boards. For example, the circuit boards 412 and 416 can be conventional printed circuit boards. In accordance with at least some embodiments of the present disclosure, the first circuit board 412 is formed using a ceramic substrate, and the second circuit board 416 is formed using a conventional composite substrate. In accordance with still other embodiments, the first 412 and second 416 circuit boards are formed using ceramic substrates.

Various of the components of the antenna system 104 package 202 can be joined to one another by mechanical fasteners, adhesives, welding, soldering, or by various combinations thereof. For example, as depicted in FIG. 4, mechanical fasteners 446 can be provided to connect some or all of the package 202 components. In addition, provisions for mechanical fasteners, for instance in the form of mounting holes 450, can be provided as part of the top plate 204, in addition or instead of as part of the base 210, for mounting the antenna system 104 package 202 to a platform 106.

Figure 5:
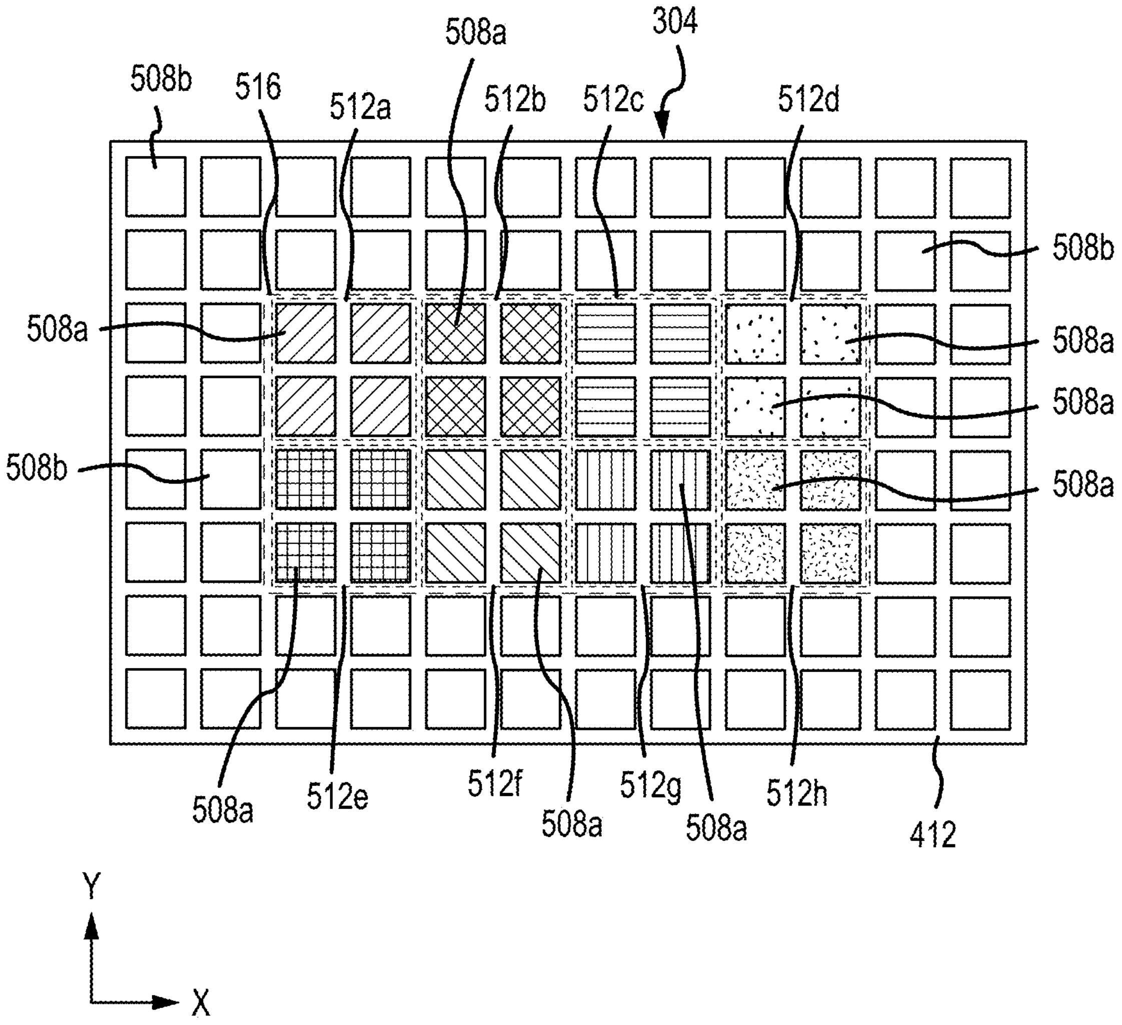
FIG. 5 depicts portions of an antenna system, and in particular an array of antenna elements, in accordance with embodiments of the present disclosure in a top plan view.

FIG. 5 depicts portions of an antenna system 104, and in particular depicts an array 304 of antenna elements 508 in accordance with embodiments of the present disclosure in a top plan view. In accordance with embodiments of the present disclosure, the antenna elements 508 include active antenna elements 508*a*, and passive antenna elements 508*b* disposed on a substrate. In accordance with at least some embodiments, the substrate can be in the form of a first circuit board 412 on which components in addition to the antenna elements 508, such as various passive feed circuit components 308, are formed. As used herein, an active antenna element 508*a* is connected to an RF I/O interface 340 via one or more signal lines that are formed by and extend across passive feed circuit elements 308 on the first circuit board 412 and active feed circuit elements 312 on the second circuit board 416. Moreover, an active antenna element 508*a* can be operated to send and/or receive RF signals, while a passive antenna element 508*b* is not connected to the RF I/O interface 340, and can be a floating element, connected to ground, or connected to other elements, components, or conductors that are not part of an active transmission or reception signal line. In addition, in accordance with embodiments of the present disclosure, a passive antenna element 508*b* is not connected to any active feed circuit elements 312.

As seen in the illustrated example, the passive antenna elements 508*b* are arranged about a perimeter or border of the array 304, and generally surround the active antenna elements 508*a*, which are generally disposed in an interior area 516 of the array 304. In addition, the active antenna elements 508*a* are grouped into a number of super elements 512. In the illustrated example, eight super elements 512*a*-512*h* are shown. However, an antenna system 104 in accordance with embodiments of the present disclosure can have any number of super elements 512. In addition, although in the illustrated example there are four active antenna elements 508*a* in each super element 512, an antenna system 104 in accordance with embodiments of the present disclosure can have super elements 512 with any number of active antenna elements 508*a*. As discussed in greater detail elsewhere herein, the active antenna elements 508*a* within a given super element 512 can be operated in unison. In addition, in accordance with embodiments of the present disclosure, each super element 512 includes at least one side or edge that borders or coincides with an outside perimeter of the area 516 containing the active antenna elements 508*a* of the array 304. Accordingly, no super element 512 within the array 304 is entirely surrounded by other super elements 512. This configuration facilitates the provision of signal components associated with the super elements 512. In accordance with at least some embodiments of the present disclosure, the overall shape or outline of the radome 208 in a top plan view mirrors the shape of the array 304 in top plan view. In accordance with further embodiments, the outline of the radome 208 can differ from that of the array 304. For example, ends of the radome 208 can be tapered, as shown in FIG. 2B, while the overall form of the array 304 covered by the radome 208 can be rectangular, as shown in FIG. 5.

Figure 6:
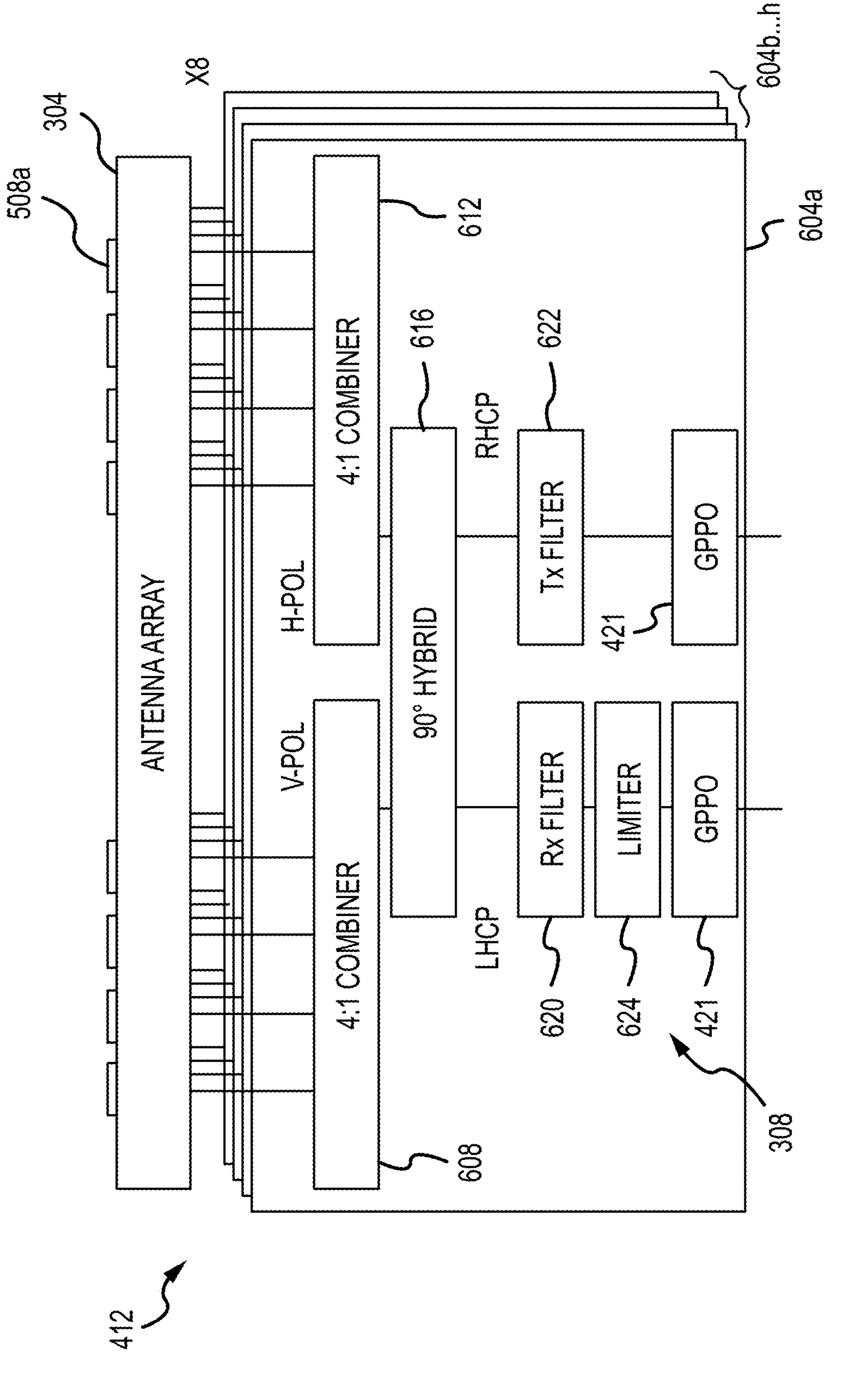
FIG. 6 depicts components of a first circuit board of an antenna system in accordance with embodiments of the present disclosure.

FIG. 6 is a functional block diagram of components of a first circuit board 412 of an antenna system in accordance with embodiments of the present disclosure. In particular, these components can include the antenna elements 508 of the array 304, and passive feed circuit components 308. More particularly, the passive feed circuit components 308 can include multiple instances of the same set of passive feed circuit components 604, with one set of the passive circuit components 604 for each super element 512. For example, where the array 304 includes eight super elements 512*a*-512*h* (see FIG. 5), there are eight sets of passive feed circuit components 604*a*-604*h* included in the passive combiner and signal conditioning components 308. Each set of circuit components 604 can support signals of first and second polarizations. Accordingly, each set of circuit components 604 in this example includes a first combiner 608 for signals having a first polarization (e.g., a vertical polarization) and a second combiner 612 for signals having a second polarization (e.g., a horizontal polarization). In this example in which four active antenna elements 508*a* are included in each super element 512, the combiner circuits 608 and 612 for signal paths of the first and second polarizations respectively are 4:1 combiners. In addition, each set of circuit components can include a 90 degree hybrid circuit 616 and filters 620 and 622. More particularly, a signal path for a polarization assigned to receiving signals (in the example illustrated in FIG. 6, the first polarization) can include a receive filter 620, and can additionally include a limiter 624, while a signal path for a polarization assigned to transmitting signals (in the example illustrated in FIG. 6, the second polarization) can include a transmit filter 622. The RF I/O 340 for each polarization signal path includes a first half 421 of a connector 420 configured to mate to a corresponding second half 423 of a signal connector 420 included as part of the second circuit board 416.

Figure 7:
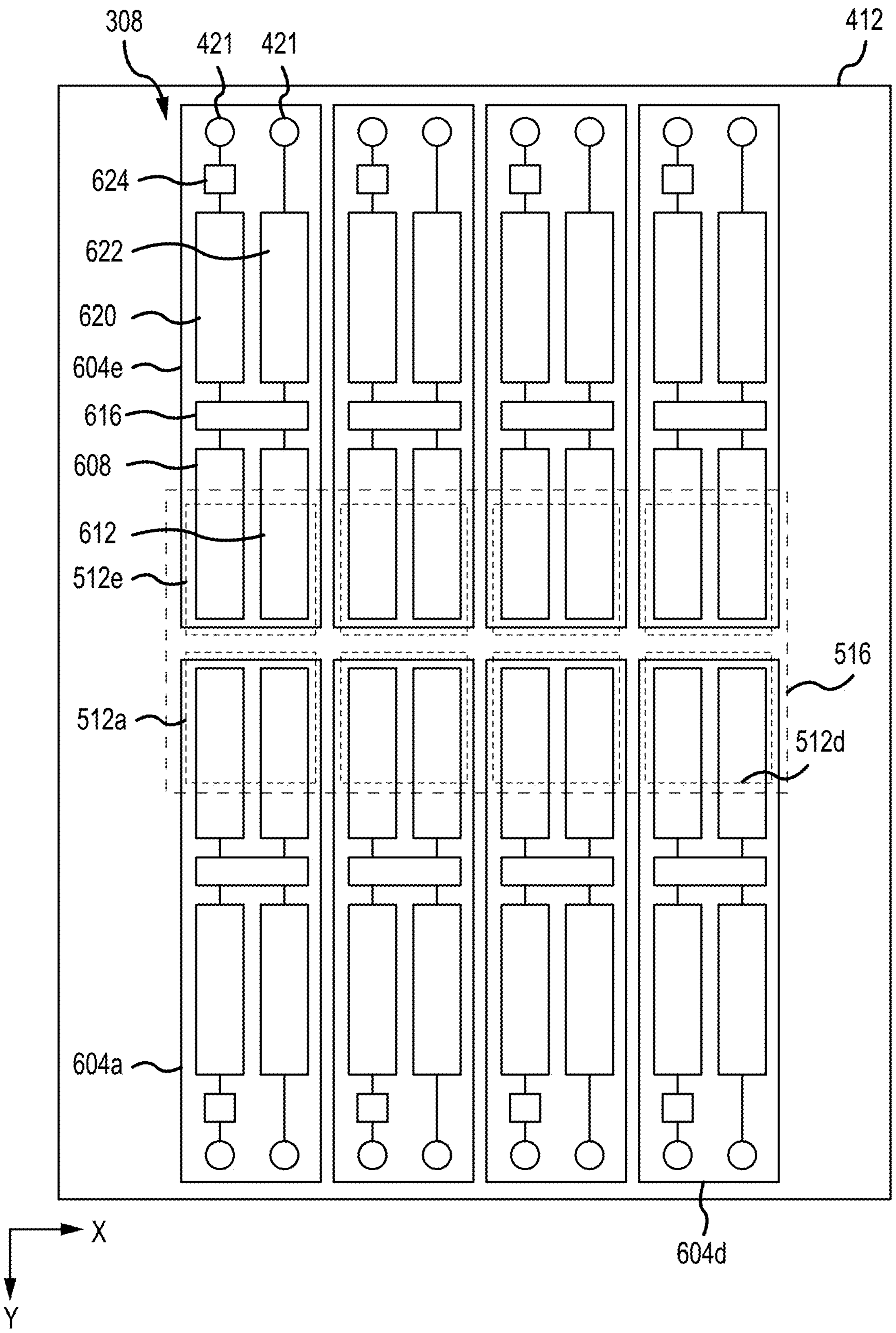
FIG. 7 depicts portions of an antenna system, and in particular components included in the first circuit board of an antenna system in accordance with embodiments of the present disclosure in a top plan view.

FIG. 7 depicts portions of an antenna system 104, and in particular is a schematic depiction of components included in the first circuit board 412 of an antenna system 104 in accordance with embodiments of the present disclosure in a plan view. More particularly, while FIG. 5 depicts the antenna elements 508 formed on a first or top surface of the first circuit board 412, FIG. 7 depicts sets 604 of passive feed circuit components 308 (i.e., components other than antenna elements 508) provided as part of the first circuit board 412. Moreover, example dispositions of the sets 604 of passive feed circuit components 308 relative to one another and relative to associated sets of super elements 512, within the generally planar structure of the first circuit board 412, are depicted. In particular, as can be appreciated by one of skill in the art after consideration of the present disclosure, some or all of the passive feed circuit components 308 can be formed on a bottom surface or in intermediate layers 414 of the first circuit board 412.

In accordance with embodiments of the present disclosure, the antenna array 304 is configured such that each individual super element 512 forms at least a portion of an outside edge of an area 516 containing the active antenna elements 508*a*. As illustrated in FIG. 7, this configuration allows the passive feed circuit components 308 and other support circuitry to occupy areas on a second surface and/or interior layers of the circuit board 412 that are peripheral to an area underlying the area 516 containing the active antenna elements 508*a*, in addition to the area directly underlying those active antenna elements 508*a* supplied by the feed circuit components 308. For example, portions of the support circuitry can be placed under areas in which passive antenna elements 508*b* are formed, and/or under areas that do not contain any antenna elements 508. Accordingly, at least portions of the combiners 608 can be placed on a second surface or side of the first circuit board 412 substrate in an area underlying an area 516 in which the active antenna elements 508*a* included in an associated super element 512 are formed. Other components, such as the 90 degree hybrid circuits 616, filters 620 and 622, and limiters 624 can be formed under areas of the circuit board 412 on which passive antenna antenna elements 508*b* are formed, or outside of a perimeter containing antenna elements 508 of any type. Portions 421 of connector elements can be disposed along or adjacent outside edges of the circuit board. Accordingly, the antenna elements 508 and associated passive feed circuit components 308 can be provided in a relatively thin, compact format. This configuration thus facilitates the provision of an antenna system 104 within a low-profile package 202.

Figure 8:
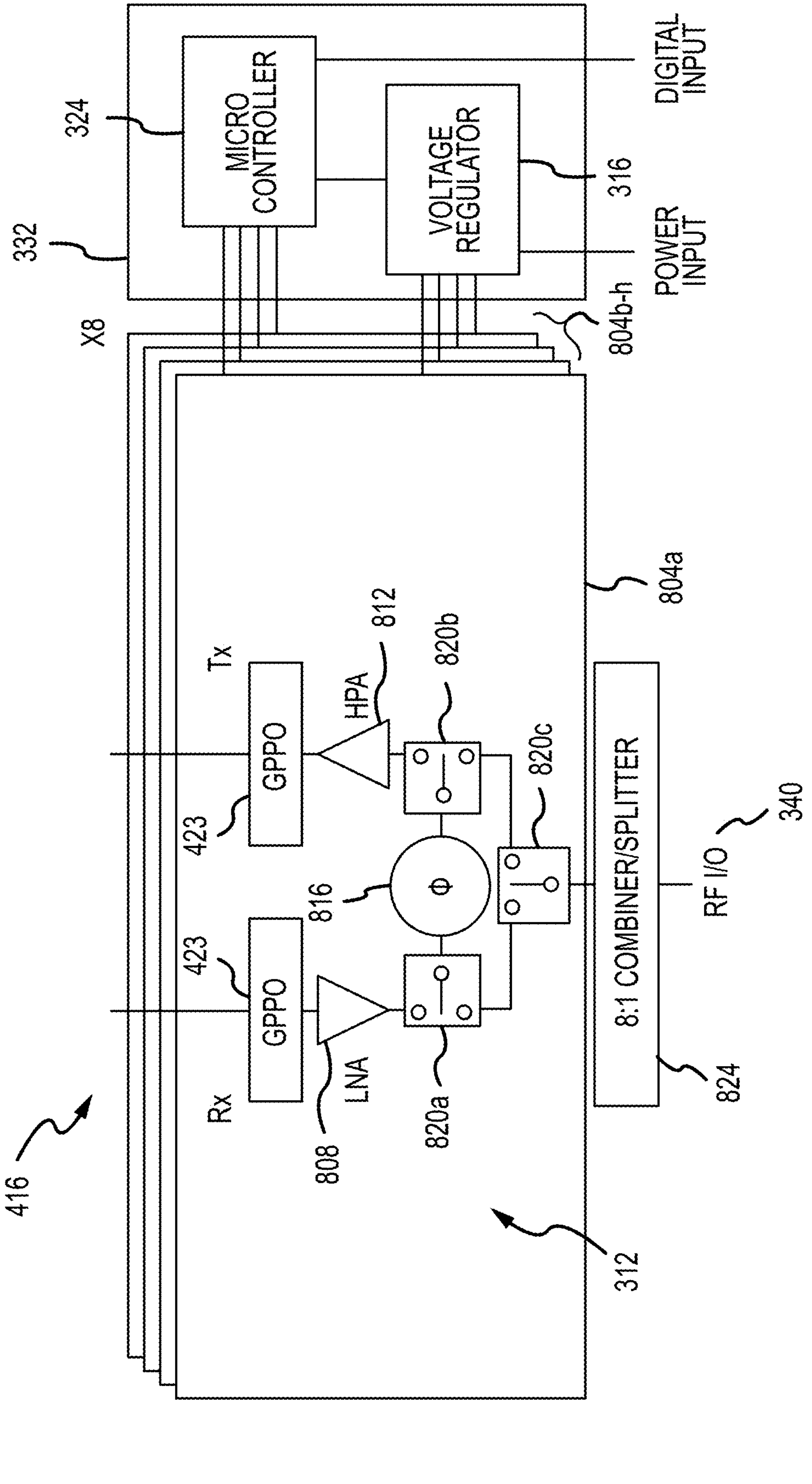
FIG. 8 depicts components of a second circuit board of an antenna system in accordance with embodiments of the present disclosure.

FIG. 8 is a functional block diagram of components of a second circuit board 416 of an antenna system 104 in accordance with embodiments of the present disclosure. In general, the components of the second circuit board 416 can include the active feed circuit components 312, such as beam steering circuit components. The active feed circuit components 312 can include multiple instances of the same set of active feed circuit components 804, with one set of active feed circuit elements 804 provided for each set of passive circuit components 604 of the first circuit board 412 (and thus one set of active feed circuit components 804 for each set of super elements 512 within the antenna array 304). Accordingly, continuing with an example in which the antenna system 104 includes eight sets of super elements 512*a-h* and eight sets of passive feed circuit components 604*a*-604*h*, there are eight sets of active feed circuit components 804*a*-804*h* included in the active feed circuit components 312. The components in each set of active feed circuit components 804 can include second connector portions 423 that are configured to mate to the first connector portions 421 of the first circuit board 412. In addition, each signal path for received signals can include a low noise amplifier 808, while each signal path for transmitted signals can include a high power amplifier 812. Each set of circuit components 804 can also include a phase shifter 816. An arrangement of three switches 820*a-c* and associated signal lines enables the phase shifter 816 to be placed in the signal path of either the received or transmitted signals. Accordingly, each super element 512 can have an associated beam steered independently of the beam of any other super element 512 in the array 304. A combiner/splitter 824 connects each of the sets of active feed circuit components 312 to a common RF I/O 340. Where the antenna system 104 includes eight super elements 512, the combiner/splitter 824 is an 8:1 combiner/splitter.

As can be appreciated by one of skill in the art after consideration of the present disclosure, the elements of the second circuit board 416 can include various active elements. Accordingly, the second circuit board 416 can include or be associated with the power and signal inputs.

Moreover, the power supply 316 components, such as a voltage regulator, and the control system components 324, such as a micro controller 324, can be provided as part of or can be connected to the second circuit board 416. In contrast, the first circuit board 412 can, in accordance with at least some embodiments, include only passive components.

Figure 9:
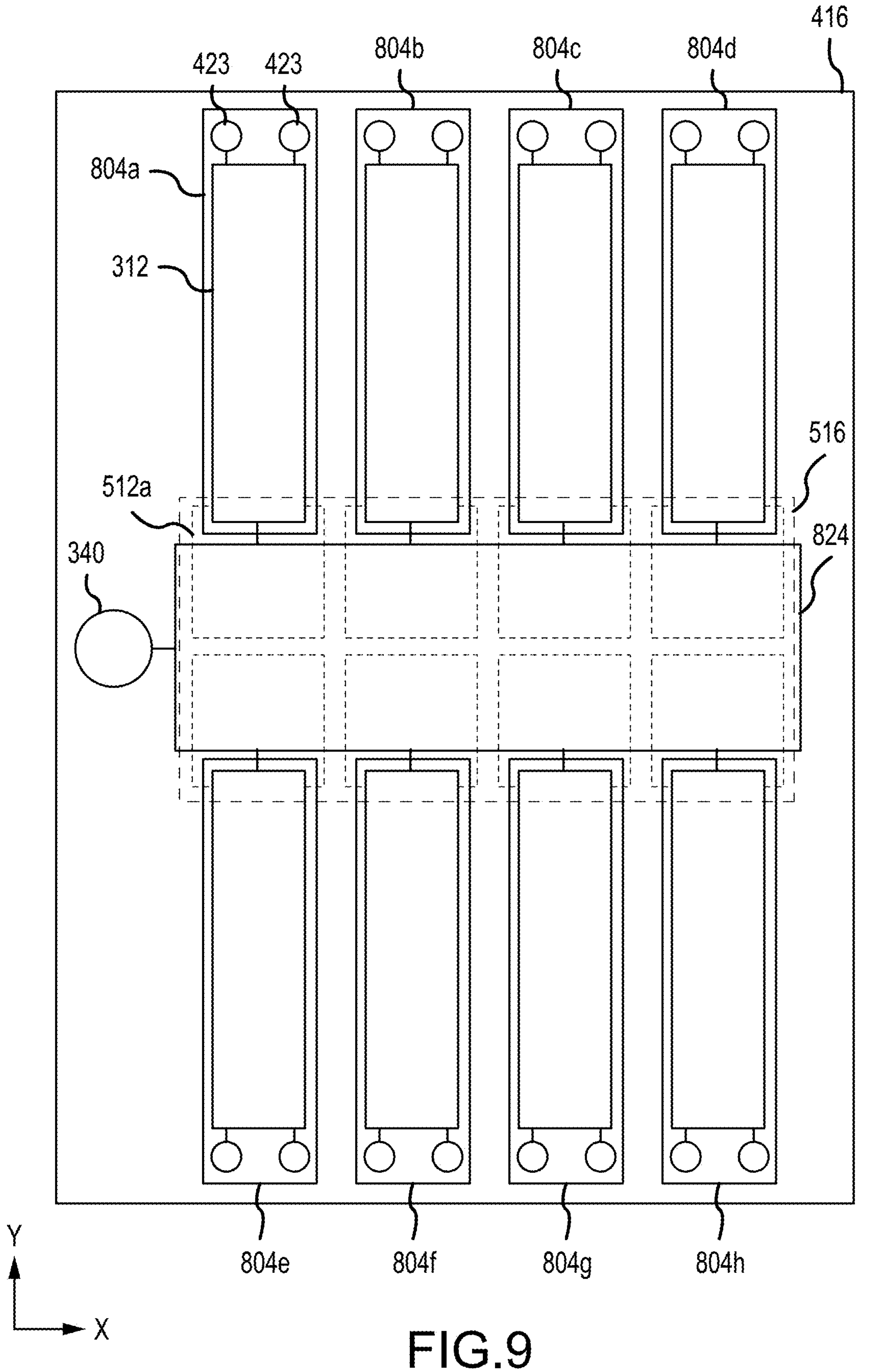
FIG. 9 depicts portions of an antenna system, and in particular components included in the second circuit board of an antenna system in accordance with embodiments of the present disclosure in a top plan view.

FIG. 9 depicts portions of an antenna system 104, and in particular is a schematic depiction of components that can be included in the second circuit board 416 of an antenna system 104 in accordance with embodiments of the present disclosure in a top plan view. Connector element portions 423 can be located along or adjacent outside edges of the second circuit board 416, and are located so that each can mate with a corresponding connector element portion 421 provided as part of the first circuit board 412. The active feed circuit components 312, including the amplifiers 808, 812, phase shifters 816, and switches 820, can be located interior to the connector elements 423, but entirely or at least partially outside of an area 516 of the antenna array 304 containing the active elements 508*a* (i.e., the elements included in the super elements 512). The combiner/splitter 824 can be disposed in an area underlying at least portions of the super elements 512. Accordingly, the active feed circuit components 312 can be provided in a relatively thin, compact format.

Figure 10:
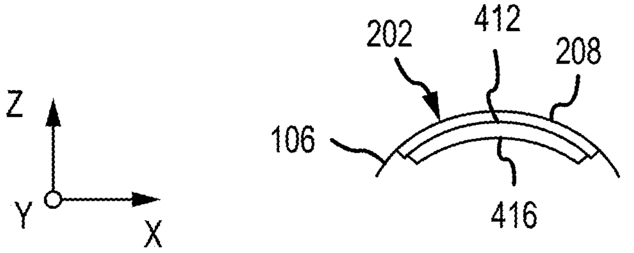
FIG. 10 depicts an antenna system in accordance with other embodiments of the present disclosure in a cross section view.

FIG. 10 depicts an antenna system 104 in accordance with other embodiments of the present disclosure in a cross section view. In this example, the antenna system 104 is provided as a package 202 that is curved about the Y axis, facilitating integration of the antenna system 104 into an associated platform 106. In particular, as depicted in the figure, the radome 208 can have a curvature within the X-Z plane in the figure that matches or nearly matches a curvature of the platform 106 within the X-Z plane. In this example, the first 412 and second 416 circuit boards are the same or similarly curved. In accordance with still other embodiments of the present disclosure, the curved radome 208 is combined with a flat first circuit board 412 and/or a flat second circuit board 416.

Figure 11:
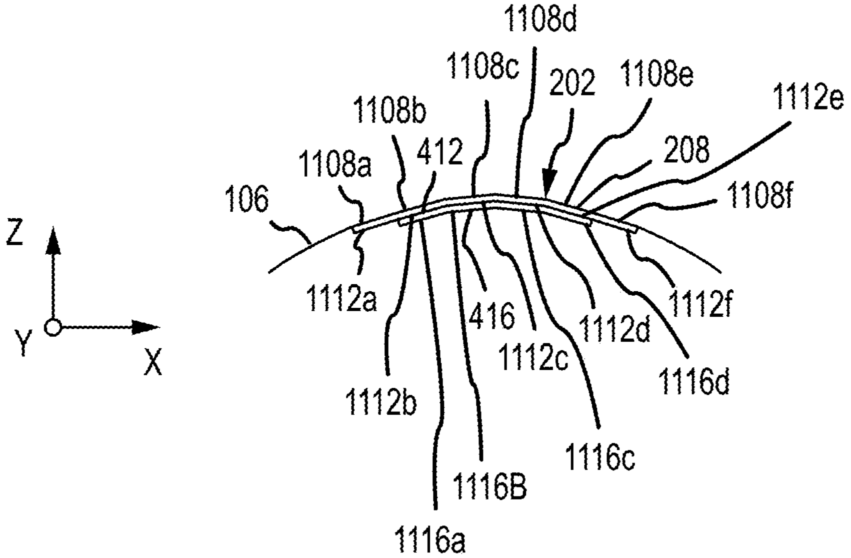
FIG. 11 depicts an antenna system in accordance with other embodiments of the present disclosure in a cross section view.

FIG. 11 depicts an antenna system in accordance with other embodiments of the present disclosure in a cross section view. In this example, the antenna system 104 is provided as a package 202 having a faceted radome 208. More specifically, the radome 208 in this example has six facets 1108*a-f*. Each facet 1108 is at an angle in the X-Z plane relative to the adjacent facet or facets 1108. As can be appreciated by one of skill in the art after consideration of the present disclosure, this configuration provides a radome 208 with an exterior surface shape that approximates a curvature of the platform 106 within the X-Z plane. The first 412 and second 416 circuit boards are similarly faceted. In the case of the first circuit board 412, six facets 1112*a-f* are provided. With reference also to FIG. 5, in this example the first facet 1112*a* contains two columns of passive antenna elements 508*b* along a first side border region of the array 304; the second facet 1112*b* contains two columns of active antenna elements 508*a* belonging to the first 512*a* and fifth 512*e* super elements, and adjacent passive antenna elements 508*b* forming portions of top and bottom border regions; the third facet 1112*c* contains two columns of active antenna elements 508*a* belonging to the second 512*b* and sixth 512*f* super elements, and adjacent passive antenna elements 508*b* forming portions of the top and bottom border regions; the fourth facet 1112*d* contains two columns of active antenna elements 508*a* belonging to the third 512*c* and seventh 512*g* super elements, and adjacent passive antenna elements 508*b* forming portions of the top and bottom border regions; the fifth facet 1112*e* contains two columns of active antenna elements 508*a* belonging to the fourth 512*d* and eighth 512*h* super elements, and adjacent passive antenna elements 508*b* forming portions of the top and bottom border regions; and the sixth facet 1112*f* contains two columns of passive antenna elements 508*b* along a second side border region of the array 304. In this example, the second circuit board 416 is smaller than the first circuit board 412 along the X dimension, and has only four facts 1116*a-d*. This configuration reflects the provision of active feed circuit elements 312 in portions of the second circuit board 416 adjacent the active antenna elements 508*a*, and the absence of the need to provide circuit board area within additional facets for any circuit elements that might be connected to the passive antenna elements 508*b*. In other embodiments, the circuit boards 412 and 416 can include the same number of facets.

As can be appreciated by one of skill in the art after consideration of the present disclosure, an antenna system 104 as provided herein provides enables an array 304 of antenna elements 508 and support circuitry, including passive 308 and active 312 circuit elements, to be provided as part of a relatively thin antenna package 202. This aspect of the invention is facilitated by configuring the array 304 such that each group of actively controlled antenna elements 508*a* (i.e. the super elements 512) has at least one border or edge that corresponds to an outer border or edge of the area 516 containing the active elements 508*a* (i.e. the area containing the super elements 512), which allows supporting circuit elements or components to extend into areas of the associated circuit boards 412 and 416 that are away from the active antenna elements 508*a* included in the array 304 in a direction that is parallel to the plane of the array 304. Moreover, an antenna system 104 in accordance with embodiments of the present disclosure can provide an array 304 of antenna elements 508 that is a planar, curved, or faceted. In accordance with at least some embodiments of the present disclosure having a curved or faceted array 304 of antenna elements 508, the array 304 is curved or faceted about an axis that extends in the Y direction (see FIGS. 5, 7, and 9). Such a configuration facilitates providing circuit elements corresponding to the super elements 512 in the same plane as the included active antenna elements 508.

In addition, embodiments of the present disclosure provide for dividing active antenna elements 508 into super elements 512, in which each active antenna element 508 within any one super element is connected to the same supporting circuitry by a combiner/splitter. As a result, the total number of discrete components can be reduced as compared to a configuration in which each active antenna element is associated with a unique set of circuit elements. This in turn allows for a reduced circuit size.

An antenna system 104 in accordance with embodiments of the present disclosure can include multiple active antenna elements 508*a* and multiple passive antenna elements 508*b* disposed on a first circuit board or substrate 412 in an array 304. In accordance with embodiments of the present disclosure the array 304 can be conformal to a structure or platform to which the antenna system 104 is mounted. Examples of structures or platforms to which the antenna system 104 can be mounted include, but are not limited to, a tower, aircraft, missile, drone, ship, truck, spacecraft, or any other stationary structure or mobile device. The antenna elements 508 of an antenna system 104 in accordance with embodiments of the present disclosure can be operated to receive, transmit, or transmit and receive electromagnetic signals or beams 124. The electromagnetic signals 124 can include communication signals sent between the antenna system 104 and other antenna systems, and communication system base stations, mobile devices, or other communication devices, signals sent as part of radar systems to determine the presence and location of distant objects, signals received from other transmission sources that the antenna system 104 is operational to detect as part of a signal or threat warning system, or any other purpose. In accordance with at least some embodiments of the present disclosure, signals associated with groups of antenna elements configured as super elements 512 that include a number of individual active antenna elements 508*a* can be phased relative to other super elements 512 to steer the beam 124. Accordingly, the antenna system 104 may form a beam 124 of radio waves that may be electronically steered to point in a selected direction, without requiring that the array 304 be physically moved. It should be appreciated that in some embodiments the array 304 may be designed to be physically moveable or stationary. The signals 124 transmitted or received by an antenna system 104 as disclosed herein may be of various wavelengths or bands of wavelengths.

In at least some embodiments, an antenna system 104 may include or be in communication with a computer, transceiver, or other control system. The computer system may execute software configured to control signals transmitted by the antenna system 104 via beam steering elements. The computer system may further be capable of processing signals received by the antenna system 104. In some embodiments, the antenna system 104 may be used to transmit and/or receive signals in a variety of directions at a single time.

Various elements of a system 104 in accordance with embodiments of the present disclosure can be formed using conventional manufacturing techniques. Such techniques can include, but are not limited to, printed circuit board manufacturing techniques.

As can be appreciated by one of skill in the art after consideration of the present disclosure, the physical characteristics of various components, such as the antenna elements 508, the spacing between antenna elements 508, the number of super elements 512, the number of active antenna elements 508*a* in each super element 512, and the number of passive antenna elements 508*b* can be determined with reference to the anticipated or desired operating characteristics of the antenna system 104. These can include but are not limited to the operating wavelengths of the antenna system 104, the operable field of view, the range of beam steering, the area available on the surface of the platform 106, or other considerations.

Figure 12:
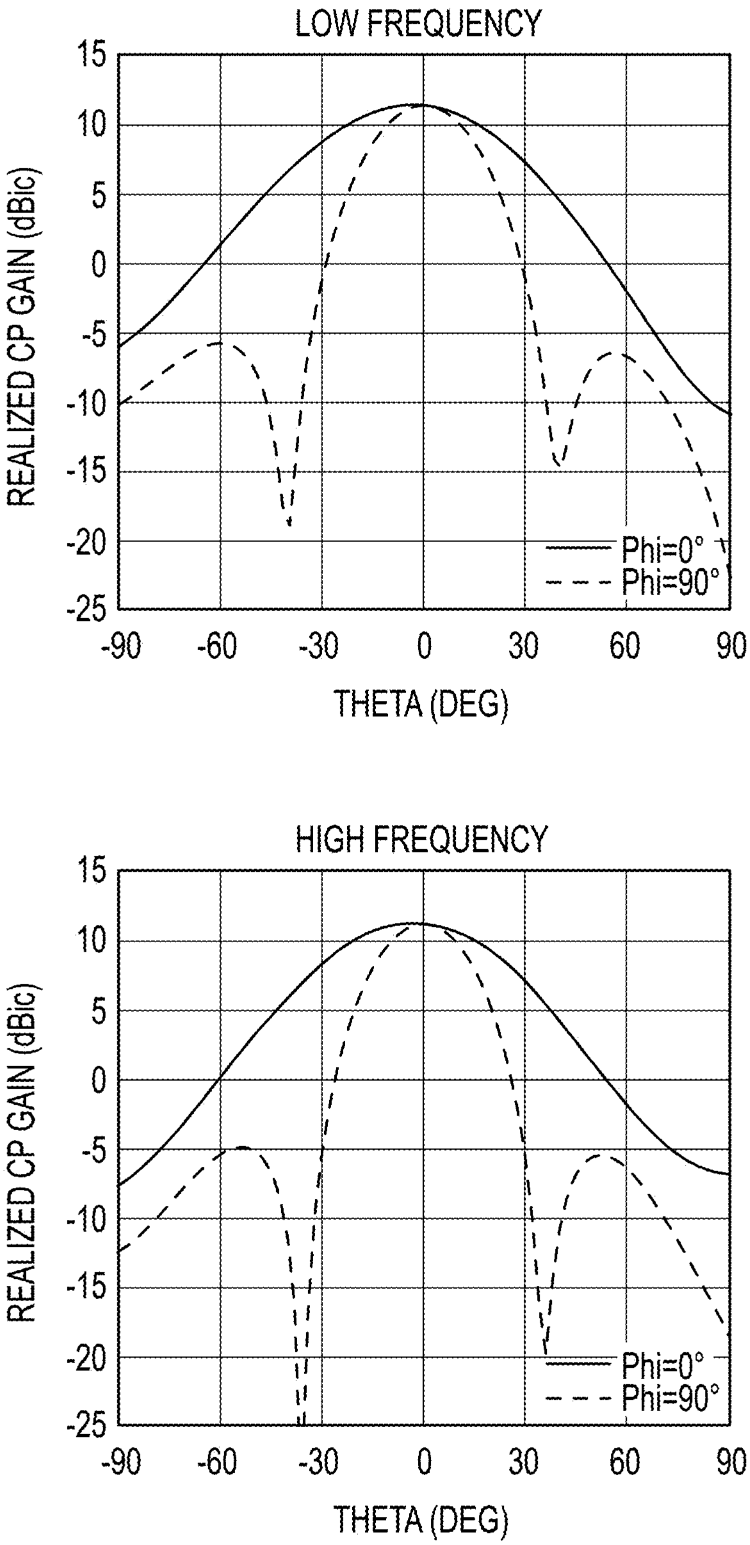
FIGS. 12-14 depict the performance of an antenna system in accordance with other embodiments of the present disclosure.
Figure 13:
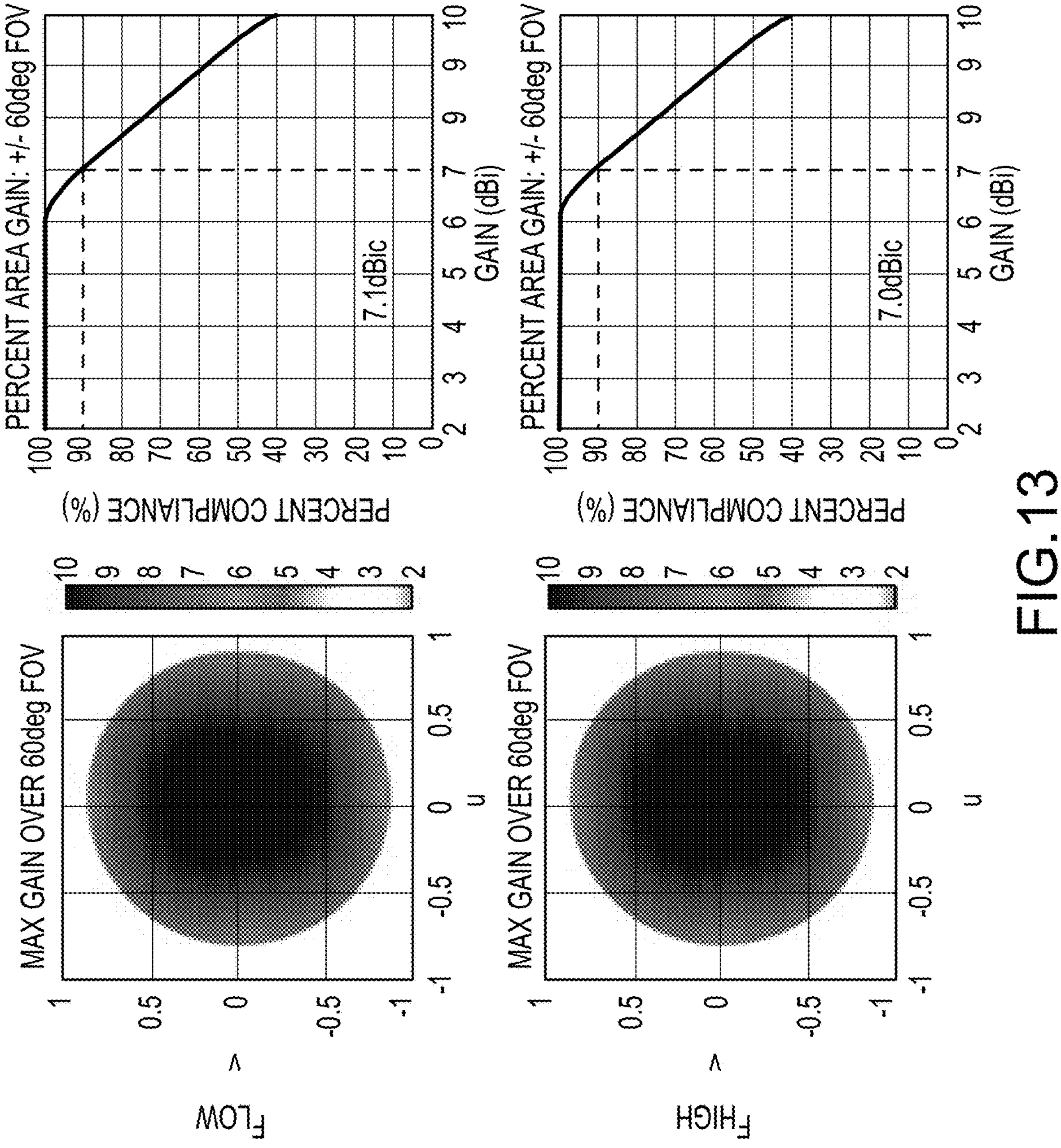
Figure 14:
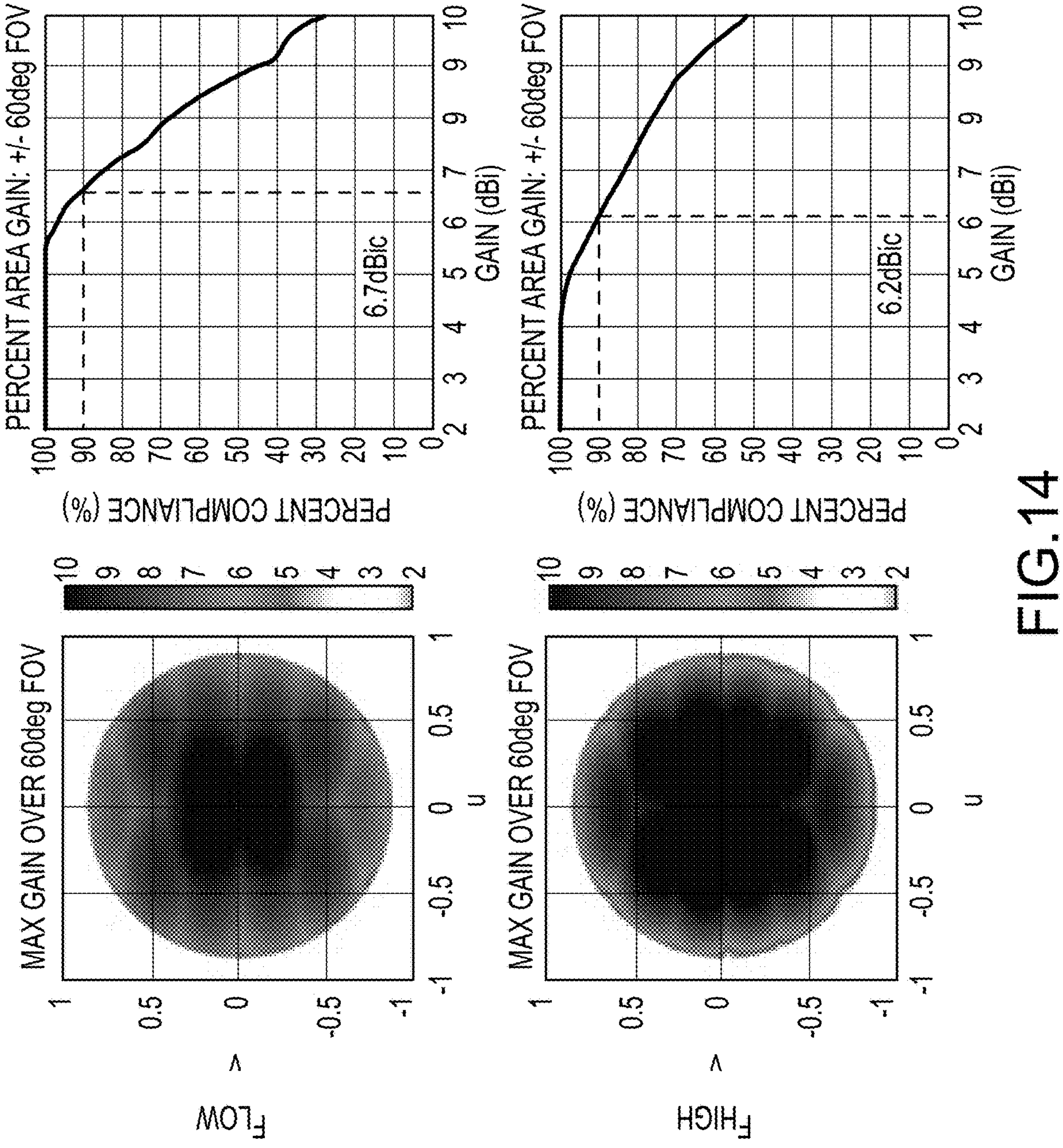

Predicted antenna radiation patterns for an antenna system 104 in accordance with an exemplary embodiment of the present disclosure are shown in FIG. 12. In this example the beam steering electronics of the antenna system 104 provide each super element 512 with an equal magnitude and phase. A gain of over 11 dBic is achieved with a minimum full beamwidth of roughly 30°. The beam steering electronics in this example can be utilized to steer the radiation pattern into one of approximately 225 possible positions as shown in FIG. 13. By selecting the correct beam, a cumulative percent area gain of over 7 dBic can be achieved within the desired ±60° cone angle. Although this gain is suitable to close the desired long range link budgets it requires precise knowledge of both the platform location, heading and location of the other communication node.

A configuration with a smaller number of supported beam positions can reduce the situational awareness dependence of the antenna system 104. For example, a 16 beam-state mode can be supported. Cumulative gain patterns and percent area gain are shown in FIG. 13 for this reduced beam-state mode. As shown less than a 1.0 dB performance degradation is achieved across the full bandwidth as compared to 225 beam-state configuration.

The antenna system 104 described herein can provide a significantly increased gain compared to an omnidirectional and multi-beam antenna and a significantly reduced cost compared to larger high end phased arrays. This makes it an excellent solution for low-cost next-generation platforms that require advanced high-frequency long-range datalinks. In addition, embodiments of the present disclosure provide an antenna system 104 in the form of a substantially planar, low profile package 202 that can be easily integrated with and attached to a platform 106. Moreover, an antenna system 104 in accordance with embodiments of the present disclosure can be configured as a package having one or more exterior surfaces that conform to an exterior surface of an associated platform 106.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. An array antenna, comprising:

a first circuit board, including:
- a set of active antenna elements, including:
  - a first plurality of active antenna elements, the first plurality of active antenna elements forming a first super element;
  - a second plurality of active antenna elements, the second plurality of active antenna elements forming a second super element, wherein the first and second super elements include active antenna elements disposed along first and second borders respectively of the set of active antenna elements;
- a first set of passive feed circuit elements, wherein the first set of passive feed circuit elements is operably connected to the first plurality of active antenna elements;
- a second set of passive feed circuit elements, wherein the second set of passive feed circuit elements is operably connected to the second plurality of active antenna elements;

a second circuit board, including:
- a first set of active feed circuit elements, wherein the first set of active feed circuit elements is operably connected to the first plurality of active antenna elements by the first set of passive feed circuit elements; and
- a second set of active feed circuit elements, wherein the second set of active feed circuit elements is operably connected to the second plurality of active antenna elements by the second set of passive feed circuit elements.

2. The array antenna of claim 1, further comprising:

a first radio frequency (RF) combiner/splitter, wherein the first set of passive feed circuit elements is connected to the first plurality of active antenna elements by the first RF combiner/splitter; and a second RF combiner/splitter, wherein the second set of passive feed circuit elements is connected to the second plurality of active antenna elements by the second RF combiner/splitter.

3. The array antenna of claim 2, wherein the active antenna elements are disposed on a first surface of the first circuit board.

4. The array antenna of claim 3, wherein at least a portion of each of the sets of passive feed circuit elements is disposed on at least one of a second surface or an intermediate layer of the first circuit board.

5. The array antenna of claim 1, wherein the sets of passive feed circuit elements are configured identically to one another, and wherein the sets of active feed circuit elements are configured identically to one another.

6. The array antenna of claim 1, wherein the first circuit board is parallel to the second circuit board.

7. The array antenna of claim 6, wherein the first and second circuit boards are printed circuit boards.

8. The array antenna of claim 1, wherein the active feed circuit elements are connected to a power supply.

9. The array antenna of claim 1, wherein the active feed circuit elements are connected to a microcontroller that is operable to supply control signals to the active feed circuit elements.

10. The array antenna of claim 1, wherein the passive feed circuit elements are not provided with any power or control signals.

11. The array antenna of claim 1, wherein the first circuit board further includes:

a plurality of passive antenna elements, wherein at least portions of the sets of passive feed circuit elements extend under areas occupied by at least portions of the passive antenna elements.

12. The array antenna of claim 11, wherein the passive antenna elements surround the active antenna elements in a plan view.

13. The array antenna of claim 1, wherein the first and second circuit boards are at least one of curved or faceted, and wherein facing surfaces of the first and second circuit boards are parallel to one another.

* * * * *